No. 12,424. REISSUED DEC. 12, 1905.
H. F. BROWN.
PROCESS OF REDUCING ORES.
APPLICATION FILED SEPT. 29, 1905.
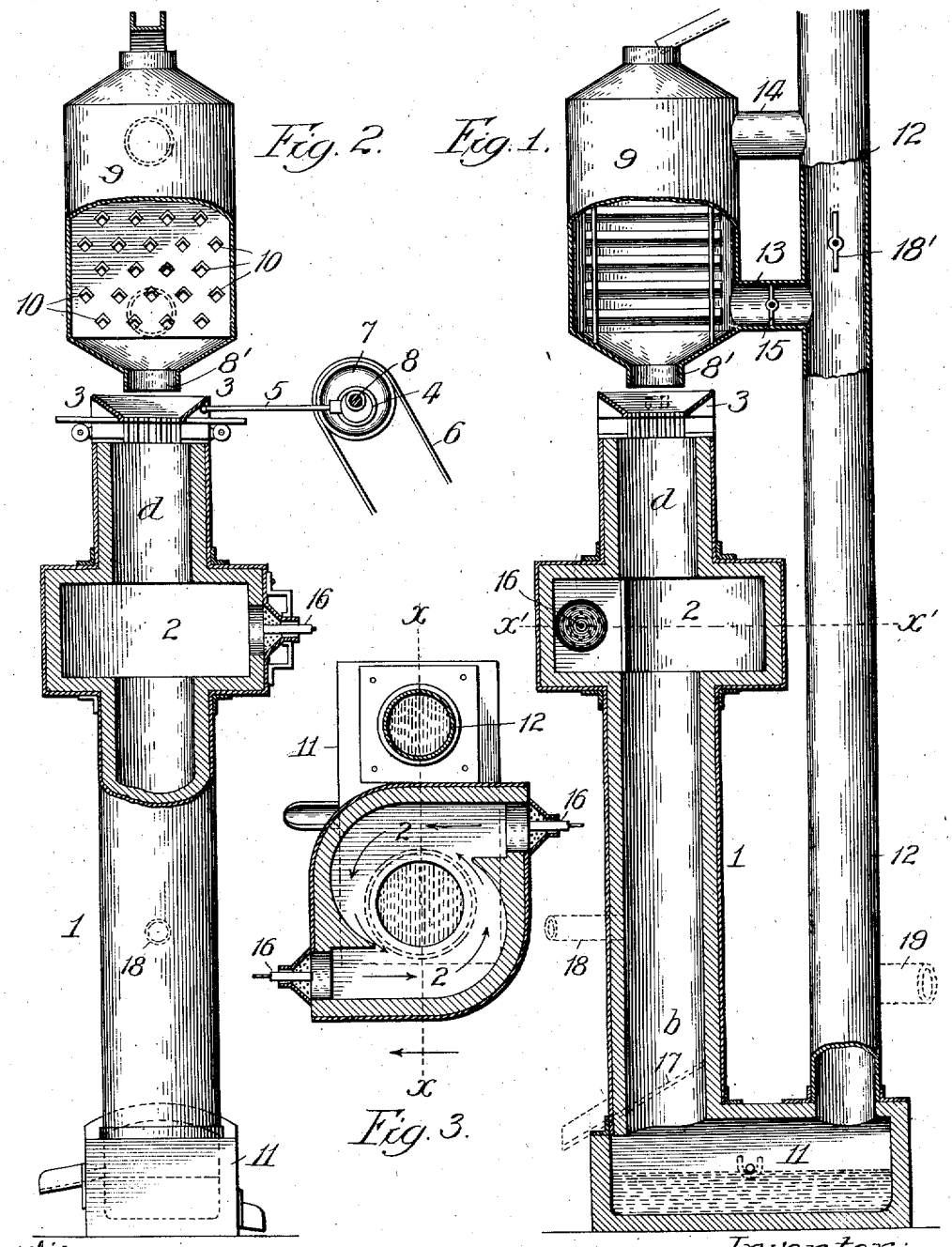
Witnesses:
Chas. E. Gaylord.
John Enders.
Inventor:
Horace F. Brown.
By Dyenforth, Dyenforth and Lee,
Attys.

UNITED STATES PATENT OFFICE.

HORACE F. BROWN, OF CHICAGO, ILLINOIS.

PROCESS OF REDUCING ORES.

No. 12,424. Specification of Reissued Letters Patent. Reissued Dec. 12, 1905.

Original No. 774,930, dated November 15, 1904. Application for reissue filed September 29, 1905. Serial No. 280,713.

*To all whom it may concern:*

Be it known that I, HORACE F. BROWN, a citizen of the United States, formerly residing at Oakland, county of Alameda, State of California, but now residing at Chicago, county of Cook, and State of Illinois, have invented certain new and useful Improvements in Processes of Reducing Ores; and I do hereby declare the following to be a full, clear, and exact description of the same.

The present invention relates to an improved process for the reduction of metallic ores or such ores wherein the constituents are freed through the agency of a reducing heat to the action of which the ore is subjected, the term "reduction" as herein employed being used in its general sense as meaning the complete separation of the constituents of the ore or the treatment thereof prior to the delivery of the ore acted upon to a collecting means for the final act of separation.

Ordinarily in the treatment of ore in what is known as a "stack" or "blast" furnace charges of ore, fluxes, and fuel, usually in the form of charcoal or coke, are alternately fed in, forming a column from eight to sixteen feet in copper and lead smelting practice and from forty to eighty feet in iron-smelting. Twyers are introduced immediately below this column of charges and a blast of air forced in, the pressure required being governed somewhat by the height of the column and the nature of the material, usually from eight to sixteen ounces and as high as forty-eight ounces. This excessive blast-pressure develops an exceedingly high local temperature, establishing what is termed a "fusing zone," extending upward from the twyers a probable average of two feet. Owing to the obstruction of the materials composing the charge, the blast and products of combustion do not pass uniformly upward through the mass, but seek channels through which they rush with great force and velocity. To a degree the whole charge is affected by the reducing properties of the heated gases that pass upward, and in proportion as all the elements of the charge are thus affected the process of reduction is facilitated. The burning of the coke has a threefold effect on the process—first, that of supplying heat for fusion; second, furnishing the required carbon for a reducing agent; third, displacement, which leaves the charge more or less porous as the coke is consumed. In what is technically known as "matte-smelting" there is no reducing action, but simply a concentration, the sulfur in the charge combining with the iron and copper, forming a copper-iron matte, which collects all the values of gold and silver. The excess of iron combines with the silica, lime, and alumina, &c., forming a slag which carries with it all the non-metallic impurities. The grade of the matte is predetermined by the amount of available sulfur in the charge. In lead-smelting and in the smelting of copper oxids the reducing action of CO (carbon monoxid) gas serves to deoxidize the previously-oxidized metals, reducing them to the metallic state, the silicates, &c., going off in the slags. Some of the sulfur is eliminated in the blast-furnace, especially where a hot blast is used, which raises the grade of the matte; but in the usual practice the excess of sulfur is burned off previous to charging the furnace.

In iron-smelting the oxidized ores are subjected to the reducing action of CO and gradually deoxidized in the slowly-descending column as the heat increases. The height of the column is sufficient to give time for complete reduction before the zone of fusion is reached. The time required depends largely upon the condition of the ore, and as it is necessary to charge the ore in coarse pieces a great height of stack is required.

The theory and practice of ore reduction by smelting are based upon the combining or fluxing action of the different ingredients of the charge. Materials that of themselves are almost infusible and, at best, under a destructive heat are readily fused at a comparatively low temperature when combined with the proper fluxing elements. In ore reduction by smelting the chief element found in the gangue-rock is silica, practically an infusible material, with more or less iron in the form of an oxid or sulfid. Molten silica ($SiO_2$) will combine with iron in the form of ferrous oxid ($FeO_3$) in practically equal amounts, and so great is their affinity that this combination takes place practically to the exclusion of all metals. Should there be an excess of iron in the charge, so there is an excess of iron in the slags, what is called a "scouring-slag" is the result, and so violent is the action of this excess of iron that it attacks the silicious material of the bottom and the walls of the crucible or furnace and causes destructive deterioration of the same. To neutralize the free acid of the slag and to render it more fluid, a fixed proportion of lime (CaO) is added. Iron and sulfur combine, in round figures, in the proportion of fifty-two per cent. sulfur (S) and forty-eight per cent. iron, (Fe,) and so strong is this affinity that this combination takes place under all conditions, and only by the oxidation of the sulfur can other than an iron sulfid, or what is known as "iron matte," be produced. This matte has the property of combining with all of the metal contents of the charge, having an unlimited capacity for taking up gold, silver, and copper, the proportionate value being governed entirely by the amount of sulfur. Consequently the first step in the concentration of the valuable metals by smelting is to eliminate the excess of sulfur. Hitherto this has been largely done by a preliminary roasting under a heat much below fusion.

The disadvantages resulting from the foregoing treatment and which the hereinafter-described process seeks to obviate, so as to reduce the cost of reduction, are: (*a*) the losses in flue-dust, owing to the unavoidable amount of fines already in the ore and the decrepitation of the various ingredients of the charge under heat; (*b*) the loss of metallic gases forced out too rapidly to be acted upon by the carbon monoxid and which, even if acted upon, are carried out by the powerful ascending blast; (*c*) the tendency of the charge to become compact, owing to the great weight of the load that must be sustained, the uneven distribution of the heat and reducing-gases through the charge, and the imperfect reduction resulting from such causes. To overcome these difficulties and to permit the use of hydrocarbon fuel, as oil or gas, or of powdered charcoal, coke, or coal-dust, as well as to utilize the heat generated in the rapid oxidation of sulfur and to conserve all possible units of heat, I have invented a simple and effective method or process for the complete reduction of the ore.

The essential feature of my improved process for desulfurizing the ore consists, first, in passing the ore in a finely-divided condition through a highly-heated non-whirling atmosphere. The necessary fluxes, it will be understood, are added previous to charging the ore. This non-whirling downwardly-moving atmosphere permits of the passage of the finely-divided particles in a state of suspension and segregation, so that every particle of the ore is acted upon individually by the said highly-heated non-whirling atmosphere. The second step resides in subjecting the particles as they pass beyond the zone of the oxidizing atmosphere to the action of a whirling-reduction atmosphere which conveys the ore downward through a reducing zone of the stack within which the ore is being treated. This atmosphere is so regulated that as it passes down the stack of the furnace a vortex is formed which brings the segregated particles together, which vortex also forms and maintains a zone of concentrated heat, so that instant combination and fusion takes place. To successfully accomplish this desired end, it is necessary to prevent a diffusion of heat by expansion of the gases, which requires that the furnace-shaft be of practically uniform size from end to end, or, preferably, slightly contracted toward its bottom. The whirling action of the reducing zone gathers together the particles of ore received therein in a segregated condition and prolongs their travel through the furnace-stack, resulting in complete fusion within the stack or during the travel of the particles through the zone of reduction.

In carrying out the improved process for the reduction of ores the ores and fluxes are crushed to a finely-divided state to the end that a more rapid chemical action may be gained during the travel or the ores through the zone of reduction.

Any suitable form of a stack-furnace may be employed in connection with the working of the process hereinafter described, one style of furnace capable of successful use, if properly modified in construction, being fully set forth and described in Letters Patent of the United States No. 689,062, issued to myself on the 17th day of December, 1901. However, a simpler form of furnace capable of use for various ores is set forth in the annexed drawings, wherein—

Figure 1 is a vertical cross-sectional view taken through the furnace-shaft, feed means for the ore, and through the hopper or storage-chamber into which the crushed or pulverized ore is fed, said view being on line *x x*, Fig. 3 of the drawings, viewed in the direction of the arrow. Fig. 2 is a longitudinal sectional view disclosing the same features in section as are set forth in Fig. 1 of the drawings, also the collecting-basin or hearth for the reduced ores, the exhaust-stack, connections whereby the utilized heat may be directed into the hopper or storage-chamber for the ore for the purpose of dehydrating the ore previous to its being fed into the reducing-blast, also disclosing the manner of arranging the furnace where the same is to be utilized in connection with use for the recovery of quicksilver or for use in connection with the manufacture of sulfuric acid; and Fig. 3 is a cross-sectional plan view taken on line *x′ x′*, Fig. 2 of the drawings, said view disclosing the arrangement of the hydrocarbon-burners.

In the drawings the numeral 1 is used to indicate a vertical furnace-shaft, the upper end portion of which is formed into or has attached thereto a combustion-chamber 2. A suitable distance above the combustion-chamber is arranged a vibratory feed-plate 3, which is actuated by the eccentric 4 by means of the connecting-rod 5. Any suitable means may be employed for operating the eccentric 4—as, for instance, a drive-belt 6, working over belt-wheel 7, attached to the shaft 8, carrying the eccentric 4. The vibratory feed-plate 3 controls the outlet opening or spout 8′ of the ore-receiving hopper or storage-chamber 9, which is arranged immediately above the said feed-plate 3. Preferably within this hopper 9 is located a series of staggered angles or laterally-projecting partition-plates 10, so that the ore is held spaced within the said hopper. The ore or material to be treated is introduced into this hopper by any suitable means in a finely crushed or pulverized condition.

Below and connected with the shaft 1 is located the collecting-chamber or hearth 11, which receives the treated material delivered from the shaft 1. From this hearth or collecting-chamber extends vertically the outlet-stack 12 for the waste products of combustion from the shaft 1. Connection is made between the stack 12 and the hopper 9 by means of the flues 13 14, the former being controlled by a damper 15. Where the material to be treated requires to be dehydrated prior to being delivered into the shaft 1, the waste products of combustion are permitted to enter the ore-hopper 9 by opening the damper 15. The hot products of combustion will then circulate throughout the openings formed in the body of ore within the hopper by the staggered angles or plates, the heated gases absorbing all moisture of the finely-pulverized ore very rapidly and finally escaping back into the exhaust-stack through the connecting-flue 14. The ore or material is thus completely dehydrated, so that it is charged to the furnace at a heat to cause the immediate ignition of all sulfur and to permit of reduction to begin at once.

The reducing-fuel utilized within the combustion-chamber for the production of a strong reducing atmosphere is oil or other carbonaceous fuel ejected into the combustion-chamber 2 in excess of the free oxygen, thus developing an excess of superheated carbon monoxid and active hydrocarbon gases which gives to the shaft a strong reducing atmosphere, which acts to fuse the material as carried through the zone of reduction. The reducing zone extends approximately the entire length of the shaft 1, although if necessary to produce a more strongly reducing atmosphere or zone than that obtained from the carbonaceous gases of oil fuel finely-powdered coke or charcoal can be fed in with the ore or be blown in at any desired point. The amount of this solid carbon thus admitted will be governed by the need of such form of carbon for reduction. The draft of the furnace is such that a downdraft is given to the shaft 1, so that the travel of the reducing-blast is in a downward direction or from the combustion-chamber toward the hearth or collecting means for the reduced material, to this extent being the reverse of the ordinary blast-furnace.

To insure a more complete combustion and a more perfect and somewhat longer contact of the ore and heat, the burners 16 for the oil fuel are so arranged within the combustion-chamber that the flame is given a spiral or rotating motion which will follow down the shaft, making a longer travel or path of travel for the falling ore. The gentle friction of the walls of the stack will cause the gases to hang slightly, which will tend to form a vortex down the center of the stack through which the falling material will pass, keeping free of the outer walls. This will prevent accretion, and also being a non-conducting medium the gases will prevent the falling ore from being cooled.

The ore is fed by the vibratory feeder into the combustion-chamber through a highly-heated downwardly-moving non-whirling atmosphere in a finely pulverized or crushed condition and in suspension is delivered to the reducing-flame, and thus carried downward with the movement of the blast through the reducing zone, which, as before stated, is approximately the entire length of the said shaft.

Where ore is being treated for the recovery of quicksilver, the furnace-shaft is formed with an inclined bottom 17, which deflects the waste material into any suitable collecting device. The fumes are carried off from the shaft through an outlet-pipe 18, which exhaust-pipe leads to or connects with any suitable means for collecting or for recovering the quicksilver from the fumes.

In case the process is employed for treating ore for the manufacture of sulfuric acid a damper 18′ in the exhaust-stack is closed and the fumes exhausted through the outlet-pipe 19 and treated thereafter in the usual manner.

Whatever style of furnace construction be utilized the process of reduction by passing the finely crushed or pulverized ore through a shaft in contact with and in the same line of travel as the travel of the hydrocarbon or reducing blast is the same. The described process is a continuous one in contradistinction to the independent-charge system hereinbefore employed.

The zone of reduction within the furnace-shaft may properly be defined as existing between the points *a b*, Figs. 1 and 2 of the drawings. While the zone of reduction is described as existing between the points *ab*, it must be understood that the atmosphere maintained between the vibratory feed-plate 3 and the combustion-chamber 2 is the highly-heated downwardly-moving non-whirling atmosphere to the action of which the ore is first subjected during its travel through the stack. In the present case no distinction is made between an oxidizing and a reducing atmosphere, inasmuch as the term "reduction" is employed to cover such action as takes place between the points *a b*, or what has been designated as the "reduction-zone."

I am well aware of the fact that heretofore the roasting and smelting of ore has been accomplished by passing pulverized ore through a stack in contact with a downwardly-moving body of heat, such as described in Letters Patent No. 516,662, granted to J. J. Storer March 20, 1894; but in such furnace the ore is not first subjected to the action of an approximately non-whirling highly-heated downwardly-moving atmosphere and thence conveyed through a whirling body of downwardly-traveling reducing atmosphere which collects the segregated particles of ore by creating a vortex. The devices set forth in earlier Letters Patent, No. 41,250, granted to Whelpley *et al.* January 12, 1864, and No. 103,006, granted Arey May 17, 1870, are also known to me; but neither of these devices discloses my method of treating the ore.

Having thus described my invention, what is claimed as new, and desired to be protected by Letters Patent, is—

1. The process of treating finely-divided ore, which consists in subjecting it, while in atmospheric suspension, to a preliminary-heating atmosphere, then to the action of a reducing, fusing-flame and at the same time gradually bringing the particles of ore into approximate physical contact.

2. The process of treating finely-divided ore, which consists in subjecting it, while in atmospheric suspension, to a preliminary-heating atmosphere, and then to a heating and reducing flame in the form of an inverted cone, for the purpose of bringing the particles of ore into approximate physical contact.

3. The process of treating finely-divided ore, which consists in subjecting it, while in atmospheric suspension, to an oxidizing atmosphere and then to a reducing fusing-flame, at the same time gradually bringing the particles into approximate physical contact.

4. The process of reducing ores as a continuous operation which consists in first passing the ore in a finely crushed or pulverized condition through a non-whirling atmosphere, and then subjecting the highly-heated ore to the action of a whirling heated atmosphere moving in the same direction as the travel of the falling body of ore.

In witness whereof I have hereunto set my hand.

HORACE F. BROWN.

Witnesses:
J. H. LANDES,
A. U. THORIEN.